Nov. 22, 1966    G. A. FULLER, JR., ET AL    3,286,683
COATING APPARATUS
Filed Feb. 8, 1962    13 Sheets-Sheet 6

Nov. 22, 1966  G. A. FULLER, JR., ETAL  3,286,683
COATING APPARATUS
Filed Feb. 8, 1962  13 Sheets-Sheet 8

Nov. 22, 1966   G. A. FULLER, JR., ET AL   3,286,683
COATING APPARATUS

Filed Feb. 8, 1962   13 Sheets-Sheet 9

Nov. 22, 1966     G. A. FULLER, JR., ETAL     3,286,683
COATING APPARATUS

Filed Feb. 8, 1962                           13 Sheets-Sheet 11

Nov. 22, 1966    G. A. FULLER, JR., ETAL    3,286,683
COATING APPARATUS
Filed Feb. 8, 1962    13 Sheets-Sheet 12
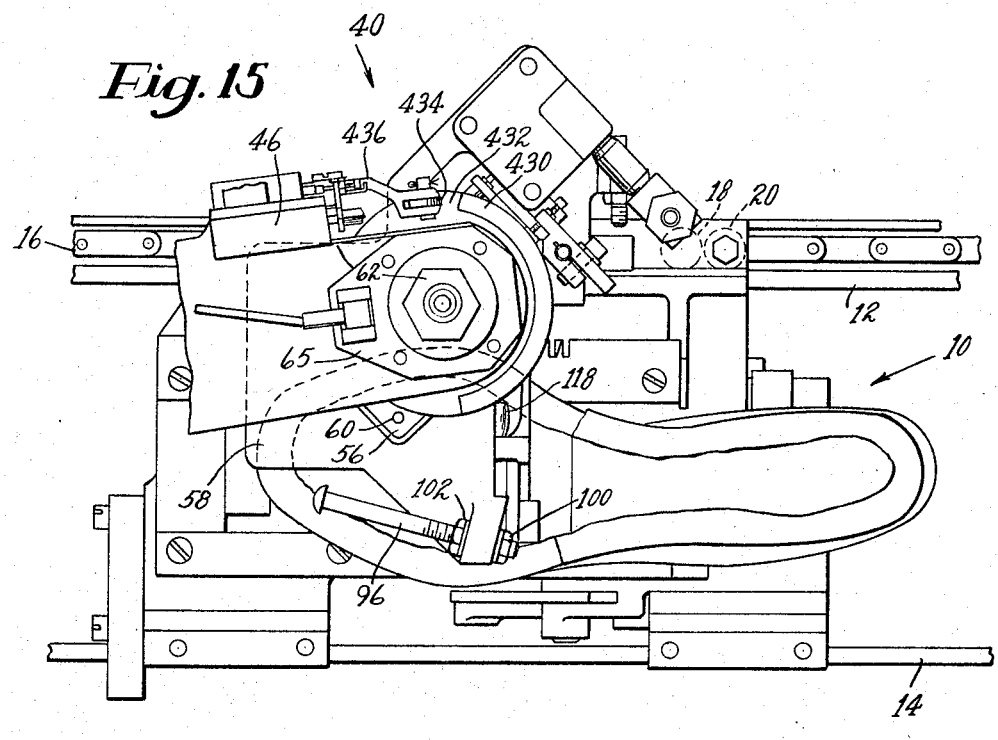
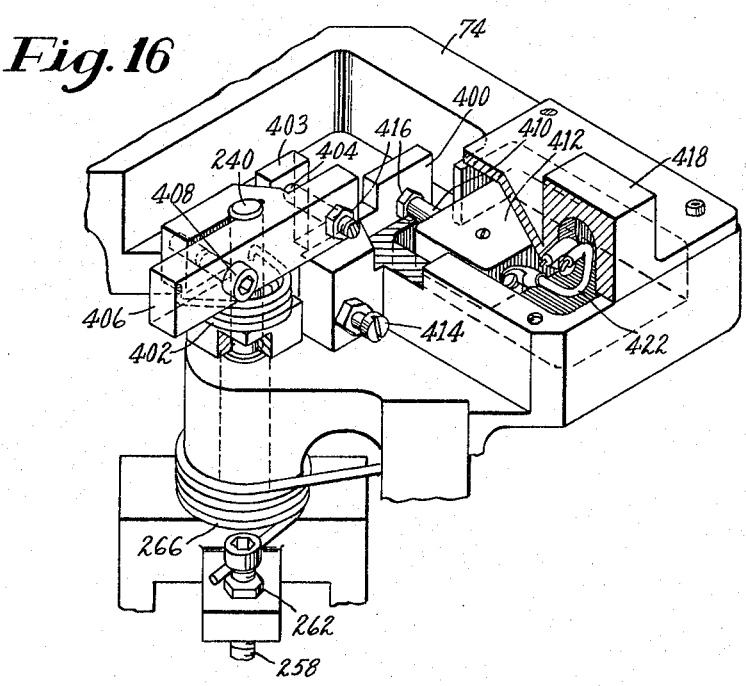

United States Patent Office 3,286,683
Patented Nov. 22, 1966

3,286,683
COATING APPARATUS
George A. Fuller, Jr., Wenham, and Robert D. Tucker, Wakefield, Mass., assignors to United Shoe Machinery Corporation, Boston, Mass., a corporation of New Jersey
Filed Feb. 8, 1962, Ser. No. 172,013
9 Claims. (Cl. 118—2)

This invention relates to improvements in coating apparatus and more particularly to apparatus particularly useful as a bottom cementing station in a conveyorized rink for bottoming flat lasted shoes, the apparatus of the cementing station being arranged and constructed to apply a coating of adhesive to the marginal areas of the lasted and roughed shoe bottoms while the shoes are being carried heel first in bottom up orientation in a predetermined feed path through the station by the conveyor. This invention is illustrated as embodied in apparatus constituting the cementing station of a conveyorized shoe bottoming rink disclosed and described in United States Letters Patent No. 3,077,619 granted February 19, 1963 in the names of William P. Hidden and Vernon H. Meyer, which patent discloses and claims certain features of novelty in the rink in general and in a leveling station in particular. The conveyorized rink disclosed in said application is adapted automatically to complete the construction of slip-lasted shoes by a series of bottoming operations performed at operating stations while the shoes are carried on a pallet around an oval track. The operations performed at such operating stations include leveling, whereby the height of the shoe on the pallet is adjusted to a predetermined position, roughing, cementing, drying, and sole spotting and attaching.

It is a general object of the present invention to provide apparatus to perform the cementing operation, which apparatus constitutes a cementing station for the aforesaid rink and operates to apply a uniform marginal coating of adhesive to the shoe bottom over a large range of shoe sizes and bottom contours.

To this end, and in accordance with a feature of the invention there is provided a cementing apparatus having a cementing head comprising a support mounted on the conveyor frame for rotation about a vertical axis and also for vertical bodily movement and horizontal bodily movement in paths transverse of the path of movement of shoes moving on pallets through the station hereinafter referred to as the feed path. The support carries on a subframe a cementing nozzle and gaging means comprising three nylon shoe engaging rolls, an upper roll engaging the shoe bottom and two side rolls which engage the side of the shoe in operative disposition. Means comprising the gaging means are provided for positioning the support during movement of a shoe through the station so that the nozzle is properly positioned with respect to the adjacent bottom edge of the shoe for coating the margin of the shoe bottom on one side.

The nozzle comprises a plurality of displaceable spring-pressed delivery members each having a foot with a forwardly grooved work engaging delivery area. The members are pivoted on a subframe for tilting as a group about a common axis while being interconnected for limited relative movement with the delivery areas arrayed to provide a dispensing area within which surface irregularities may be accommodated thus providing the advantages of a multiple delivery member type of nozzle disclosed in Patent No. 2,177,666, Wilbur L. MacKenzie. In accordance with another feature of the invention, the side rolls are effective to maintain a predetermined angular relation between the nozzle and the edge of the shoe bottom as the shoe moves through the cementing station.

Apparatus as provided by the present invention which operates intermittently to deliver liquid adhesive from a nozzle and which must be supplied with the liquid adhesive during cementing from a remote pressurized source provides a difficult problem in causing the adhesive to start to flow immediately as the nozzle first engages the shoe bottom and to stop flowing as the nozzle leaves the shoe to avoid drooling from the nozzle during periods when the nozzle is not engaging a shoe. Accordingly, another object of the invention is to provide an improved nozzle assembly which will retain the advantages of the aforesaid multiple delivery member type while providing on-off control of cement flow to the delivery areas in response to pressure of the nozzle against the shoe.

To this end, and in accordance with a feature of the invention the delivery members of the illustrative nozzle have adhesive delivery passages provided with valve means operated by tilting of the members as they engage and disengage the work. Each delivery member has, intersecting the delivery passage, a channel in which a rod is slidingly received, the rod having a transverse opening therethrough alignable with the passage by sliding of the rod, whereby the rod acts as a valve member cutting off the flow of adhesive through the delivery passage unless the aperture through the rod is alined with the passage. The outer ends of the rods are pivoted on the subframe on a common axis spaced from the pivot axis of the delivery members, whereby tilting of the delivery members relative to the subframe causes sliding movement of the rods in the transverse channel. The delivery members are normally supported on the subframe resiliently biased as a group to a position in which the delivery passages are closed by the rods while work pressure on the delivery members suffices to rock the delivery members for opening the passages to admit adhesive to the delivery areas.

Because the shoe bottoms are not flat throughout their length but have a scoop in their bottom contour intermediate their toe and heel portions, a fixed attitude of the delivery members with the delivery areas arrayed in a horizontal plane along a transverse operational axis defined by the centers of the areas in their operating position would result in improper engagement of the delivery members with the shoe bottom at the scoop portions of the shoe bottoms, resulting in starved areas and the formation of blobs of adhesive outside the adhesive band. Accordingly, it is another object of the invention to avoid the aforementioned difficulties and to this end means are provided for rocking the delivery members about the operational axis of the dispensing area to maintain this area parallel with the shoe bottom. For this purpose the subframe is mounted in the support for rotation on the aforementioned axis while a vertically movable shoe bottom feeler biased against and sensing the height of the shoe bottom adjacent the nozzle is linked to the subframe for rotation thereof to maintain a parallel relation between the delivery areas and the shoe bottom. The subframe is mounted on a pin which may be readily withdrawn manually so that the nozzle assembly may be kept overnight in a solvent bath.

Means are provided for supporting the cementing head against dropping and the horizontal urging means in a predetermined ready position when a shoe is not being operated upon by the head, and means are provided for releasing the holding means upon actuation of shoe detecting means so that the head drops upon the shoe, and with the cooperative action of the gaging rolls and horizontal bias causes the nozzle to follow the cementing margin along one side of a shoe to coat that side. For this purpose one side roll is mounted for limited movement of deflection relative to the frame of the cementing head and is arranged to actuate a switch upon engagement thereby with an incoming shoe. The switch operates upon actuation to cause the holding means to release the cementing head and to open a valve in the adhesive supply.

Toe portions of the adhesive band to be applied to a shoe bottom are oblique to the feed path. In these areas because of the transverse component of relative movement, the nozzle moves more rapidly over the bottom and a higher rate of flow of adhesive is required from the nozzle to preserve the uniformity of the adhesive coating. In accordance with a further feature of the invention means are provided for increasing the rate of adhesive flow automatically in marginal areas adjacent an edge having an angle greater than a predetermined value from the work path. For this purpose a cam plate on the support is arranged to actuate a switch in accordance with the angle of rotation of the support for controlling the supply of adhesive to the nozzle to increase the pressure at such angled toe areas of the shoe bottom.

Other features and advantages of the invention will best be understood from the following description taken together with the accompanying drawings in which:

FIG. 15 is a plan view of a portion of the apparatus shown in FIG. 2;

FIG. 16 is an angular view partly in section of a portion of the cementing head shown in FIG. 2.

Figure 1:
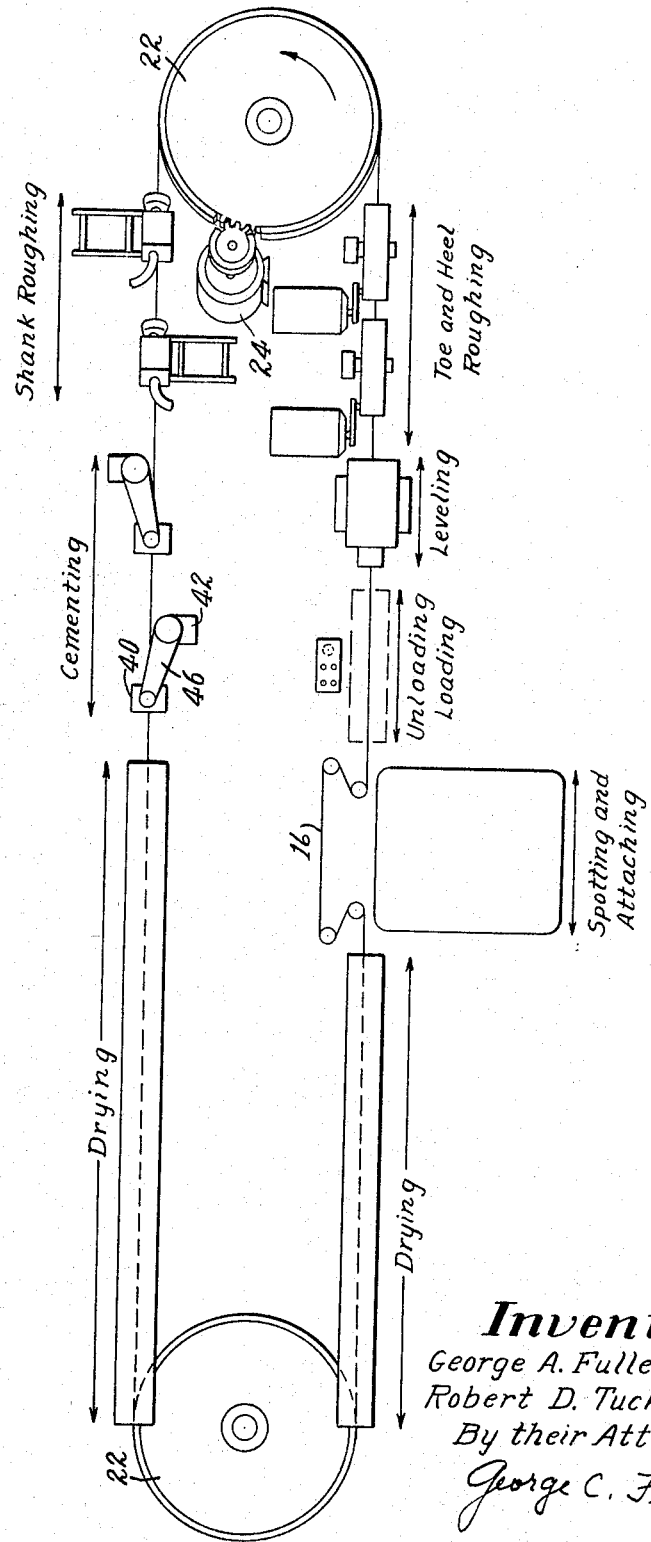
FIG. 1 is a diagram of a bottoming rink as disclosed in the aforesaid application.

The illustrative apparatus comprises a cementing station of a conveyorized rink adapted to complete the construction of slip-lasted shoes by a series of bottoming operations. The rink, shown diagrammatically in FIG. 1, is constructed and arranged for moving pallets carrying shoes in bottom-up position to and through a series of operating stations by means of a horizontal endless drive chain. The stations of the rink cover in sequence the operations of unloading and loading, leveling, roughing, cementing, drying, and sole spotting and attaching. The conveyorized rink is more fully disclosed in the forementioned Patent No. 3,077,619. Accordingly, only so much description of the conveyorized rink will be presented herein as will facilitate an understanding of the features of the cementing head which form the subject matter of the present application.

Figure 2:
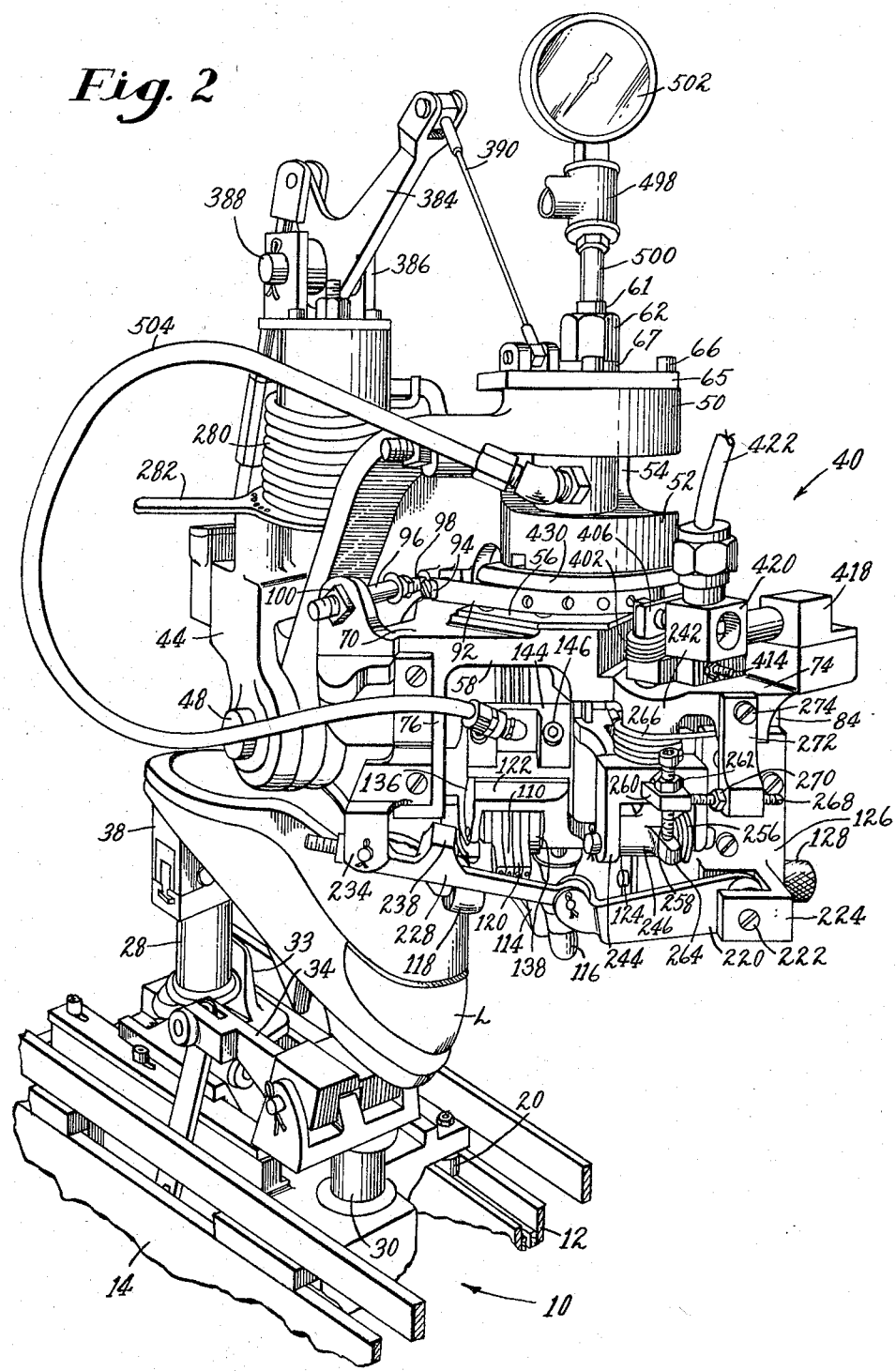
FIG. 2 is an angular view of a cementing station embodying the present invention with a shoe about to arrive at the cementing head.

Briefly described, the conveyorized rink employs detachable pallets 10 (FIGS. 2, 3 and 15) which are put on and taken off the rink at a station designated "Unloading and Loading" in FIG. 1. The rink comprises a pair of parallel rails 12, 14 forming an oval track arranged in a horizontal plane at about waist height and on which the pallets are slidable. A drive chain 16 received in the rail 12 carries rollers 18 (FIG. 15) at spaced intervals thereon corresponding to the length of the pallets. These rollers engage one of a pair of rolls 20, 20 on each pallet in driving engagement as the chain 16 is caused to move along the rail 12 and over sprockets 22 (FIG. 1) at each end of the rink by an electric motor 24. Each pallet is provided with a toe post 28 and a heel post 30 for supporting a shoe on a last in bottom-up disposition. The posts are adjustable heightwise, and as the shoe is carried on the pallet through the leveling station, the shoe is automatically adjusted to and locked in a position on its pallet with its bottom at a predetermined height and centralized widthwise of the pallet for all subsequent operations. For a more complete description of the pallet, the shoe leveling means and the operation of the leveling station, the reader is referred to said Patent No. 3,077,619.

After leveling, the shoe on each pallet is carried through stations at which the marginal bottom areas to be cemented are roughed and thence to the cementing stations where adhesive is applied to these areas.

As indicated in FIG. 1, two cementing stations are provided. At each station adhesive is applied to the margin of a shoe bottom along one side of the shoe so that after a shoe has passed through both cementing stations, which are mirror images of each other, the entire marginal area of the shoe bottom is cemented. The station particularly described herein operates to apply adhesive to the margin of a shoe bottom on the left side as viewed from above in the direction of the heel-first movement of shoes through the station. Thus, the illustrative cementing station comprises a cementing head generally designated 40 mounted on the conveyor frame for vertical bodily movement and for horizontal bodily movement in paths transverse of the feed path, that is, the path of movement of shoes through the cementing station. The mounting means comprises an upright bracket 42 secured to the conveyor frame and having an upper end formed to provide a bearing for swinging a yoke 44 about a vertical axis. An arm 46 is connected to the yoke 44 at the bottom thereof by means of a horizontal pin 48 journaled in the yoke. The upper end of the arm 46 is bifurcated into upper and lower furcations 50, 52. Through vertically alined holes in the furcations is journaled a shaft 54 carrying at its lower end a plate 56 to which a support 58 for the shoe engaging elements is attached by screws 60 (FIG. 15).

Figure 3:
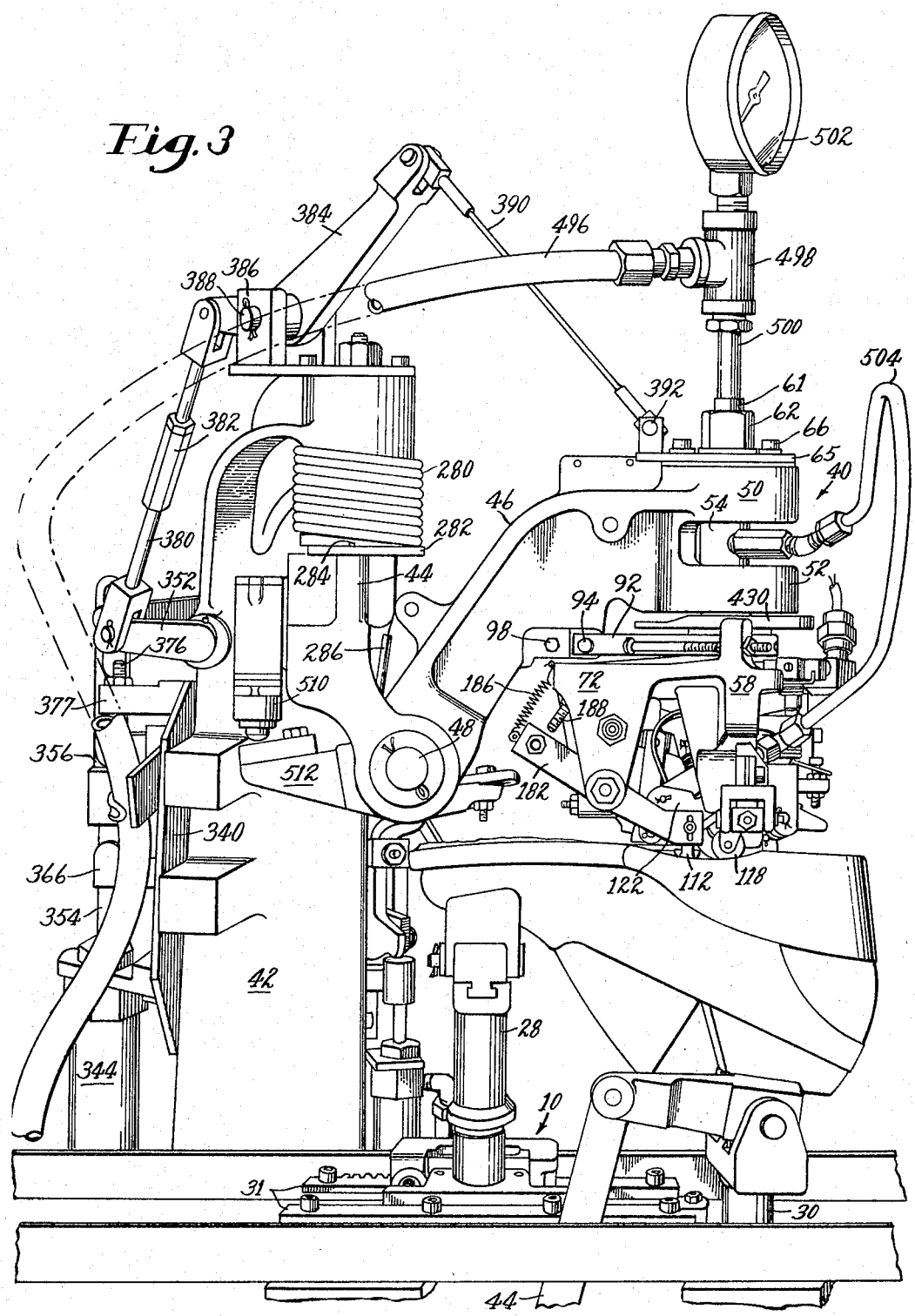
FIG. 3 is a side elevation of the apparatus shown in FIG. 2 with a shoe midway through the cementing operation.
Figure 4:
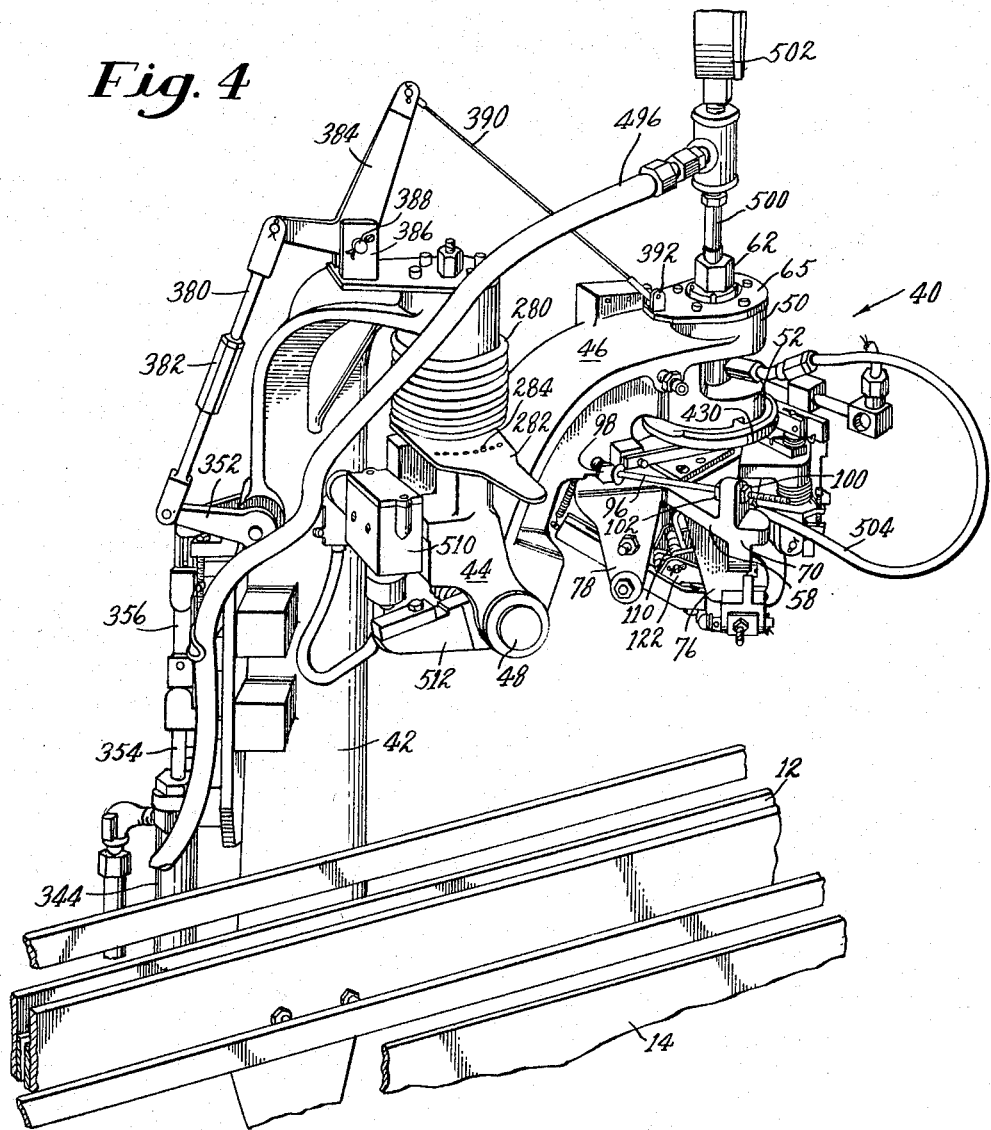
FIG. 4 is an angular view of the cementing station from a different viewpoint.
Figure 5:
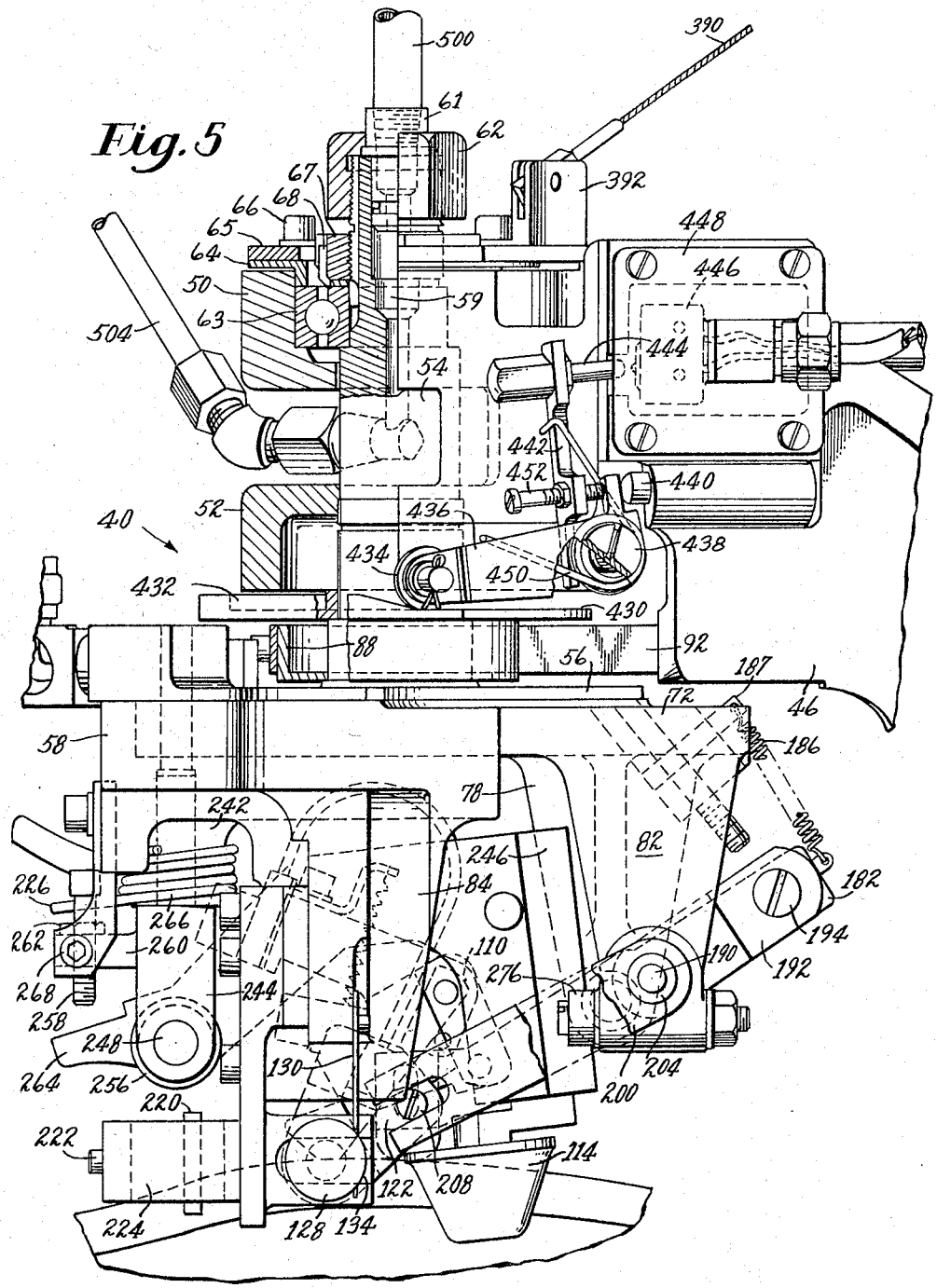
FIG. 5 is an enlarged elevation partly in section of a portion of the apparatus shown in FIG. 2.

The shaft 54 has an axially extending passage 59 (FIG. 5) extending from its top to a point intermediate of the furcations 50, 52. A pipe fitting 61 pressed downwardly upon the upper end of the shaft 54 by a nut 62 provides a means for connecting the central passage of this shaft to a source of adhesive. A ball bearing 63 is supported in the furcation 50 by a holddown ring 64 which is pressed downwardly to engage the upper surface of the bearing by a top plate 65 and screws 66. The inside race of the bearing 63 is held in place by a bearing retaining ring 67 and bearing lock nut 68 (keyed to the shaft 54 as shown in FIG. 5) which press the inside race against the shoulder of a rabbet on the shaft. The support 58 of the cementing head is a flat topped casting, the upper portion of which may be considered to be divided into three segments 70, 72 and 74 (FIGS. 2, 4, 5, 11 and 16) from which depend five legs 76, 78, 80, 82 and 84. The support 58, and more generally the cementing head 40, is yieldably urged to rotate about a vertical axis which is that of the shaft 54 by a spiral spring 86 (FIG. 6) contained in a circular case 88 encircling the shaft 54 just above the support 58. The inner end of the coil spring is fixed to the shaft while the outer end 90 is pinned to the case 88 which in turn is pinned to one end of a strap 92, the other end of which is fastened to the arm 46 by a screw 94 (FIG. 3). By this arrangement the support is yieldingly urged to rotate in a clockwise direction as viewed from above to a predetermined position determined by the engagement of the head of a stop screw 96 (FIG. 6) with the head of a limit screw 98 (FIG. 2) threaded into the arm 46. The stop screw 96 is fastened to the support 58, the screw passing through a horizontal aperture in an upstanding boss of the segment 70 and being fixed in position by two nuts 100, 102 (FIG. 15) threaded on the screw on opposite sides of the boss.

Five different shoe-engaging members are carried by the support 58. The five members consist of an adhesive applying nozzle 110 of the multiple delivery member type somewhat similar to the nozzle disclosed in Patent No. 2,293,209, MacKenzie, a shoe bottom feeler 112, a bell-shaped side roll 114, sometimes referred to as a bell roll, a smaller side roll 116 and an upper roll 118.

Figure 7:
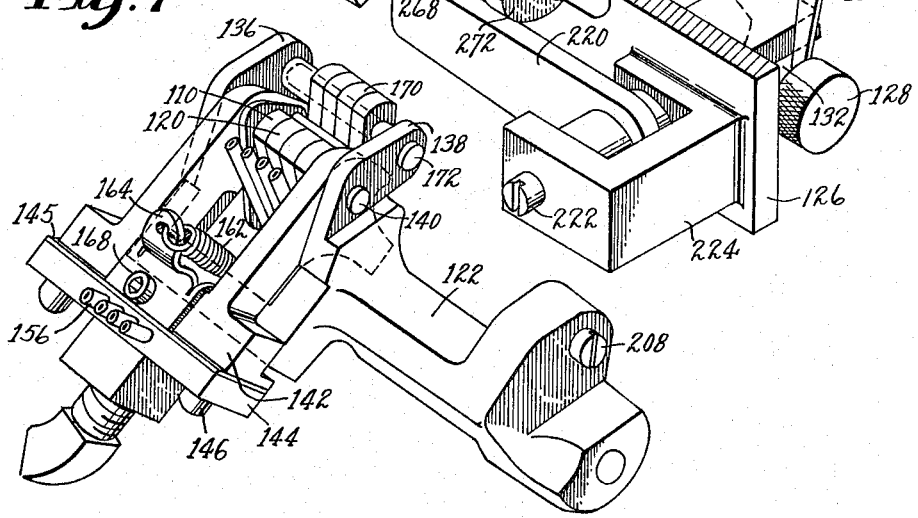
FIG. 7 is an angular view of a nozzle portion shown in FIG. 6.

The nozzle 110 comprises four delivery members 120 (FIG. 7) pivotally mounted in a subframe 122 which is journaled on a readily removable pin 124 (FIG. 8) extending through alined apertures in spaced lug portions of a boss 125 welded on a fastening plate 126 screwed to the leg 84. Normally, the pin 124 is retained in its illustrated position by a leaf spring 130 which engages the pin between its knurled head 128 and a flattened circular enlargement 132 (FIG. 8) formed integrally on the pin 124 and which fits into a slot 134 formed in the boss 125. The pin 124 may be readily withdrawn upon lifting the leaf spring 130 thereby releasing the nozzle assembly so that it may be removed to be left overnight in a solvent bath.

Referring now to FIGS. 2, 6, 7, 9 and 10, the four delivery members 120 are pivotally mounted on the subframe 122 between two parallel spaced ears, an outer ear 136 and an inner ear 138, by a pin 140 which extends through holes in the members 120 and through alined apertures in the ears 136, 138. Between the ears 136 and 138 fit the spaced parallel arms of a yoke 142 having a hollow base plate 144 to which the members are stiffly connected for limited relative movement by adhesive feeding means. The base plate 144 and a gasket 145 are secured to the base of the yoke 142 by two screws 146. Each delivery member has a longitudinal adhesive feeding passage 148 extending between an opening at an intermediate shoulder portion and an opening in a work-contacting delivery area 150 on a work-engaging foot of the member 120 provided with forwardly extending grooves in the area 150. The feeding passages 148 communicate with a plenum chamber 152 and with a hose opening 154 formed in the plate 144 through four J-shaped delivery tubes 156 which are stiffly resilient so that the members are interconnected through the yoke for limited relative movement to accommodate irregularities of the shoe bottom. A pin 160 (FIG. 9) in the yoke 142 provides a support against which the members 120 may be braced in assembling the nozzle. The members 120 are operative as a group when pressing against a shoe bottom to tilt with the yoke relative to the subframe against the force of a spring 162 which extends between a bracket 164 on the yoke and a screw 166 threaded into the subframe 122 between the ears 136 and 138. The bracket 164 is secured to the yoke 142 by a screw 168.

Figure 9:
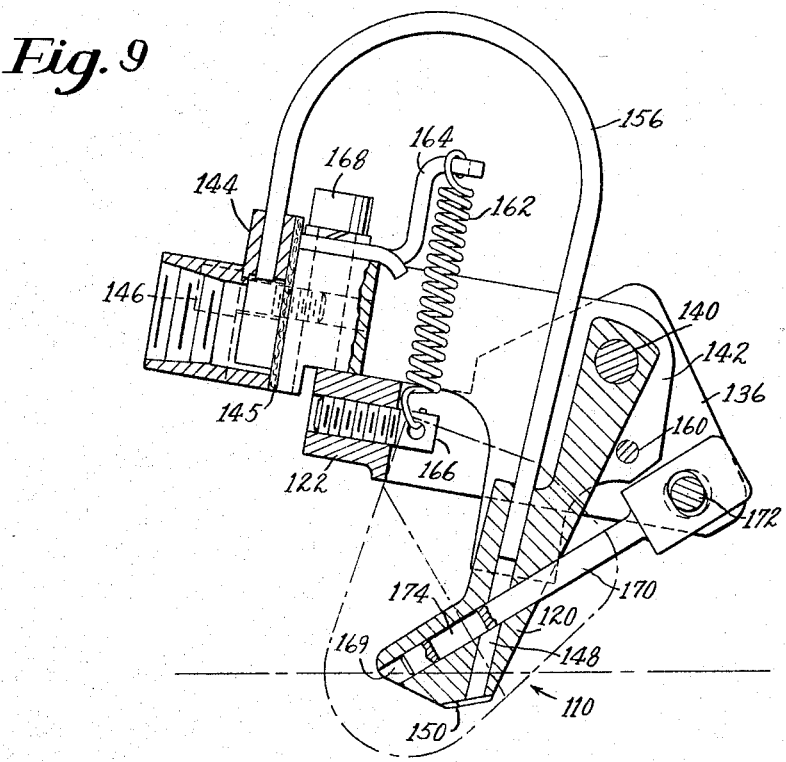
FIG. 9 is a transverse section of the nozzle structure shown in FIG. 7 showing the relation of the parts when the nozzle is out of engagement with a shoe bottom.
Figure 10:
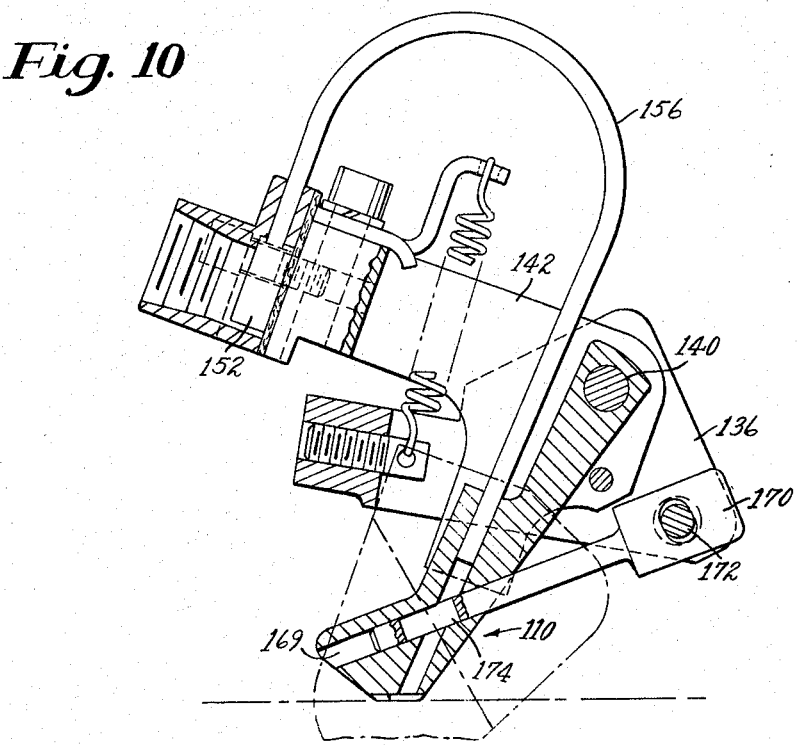
FIG. 10 is a view similar to FIG. 9 showing the relation of parts when the nozzle is in engagement with a shoe bottom.
Figure 11:
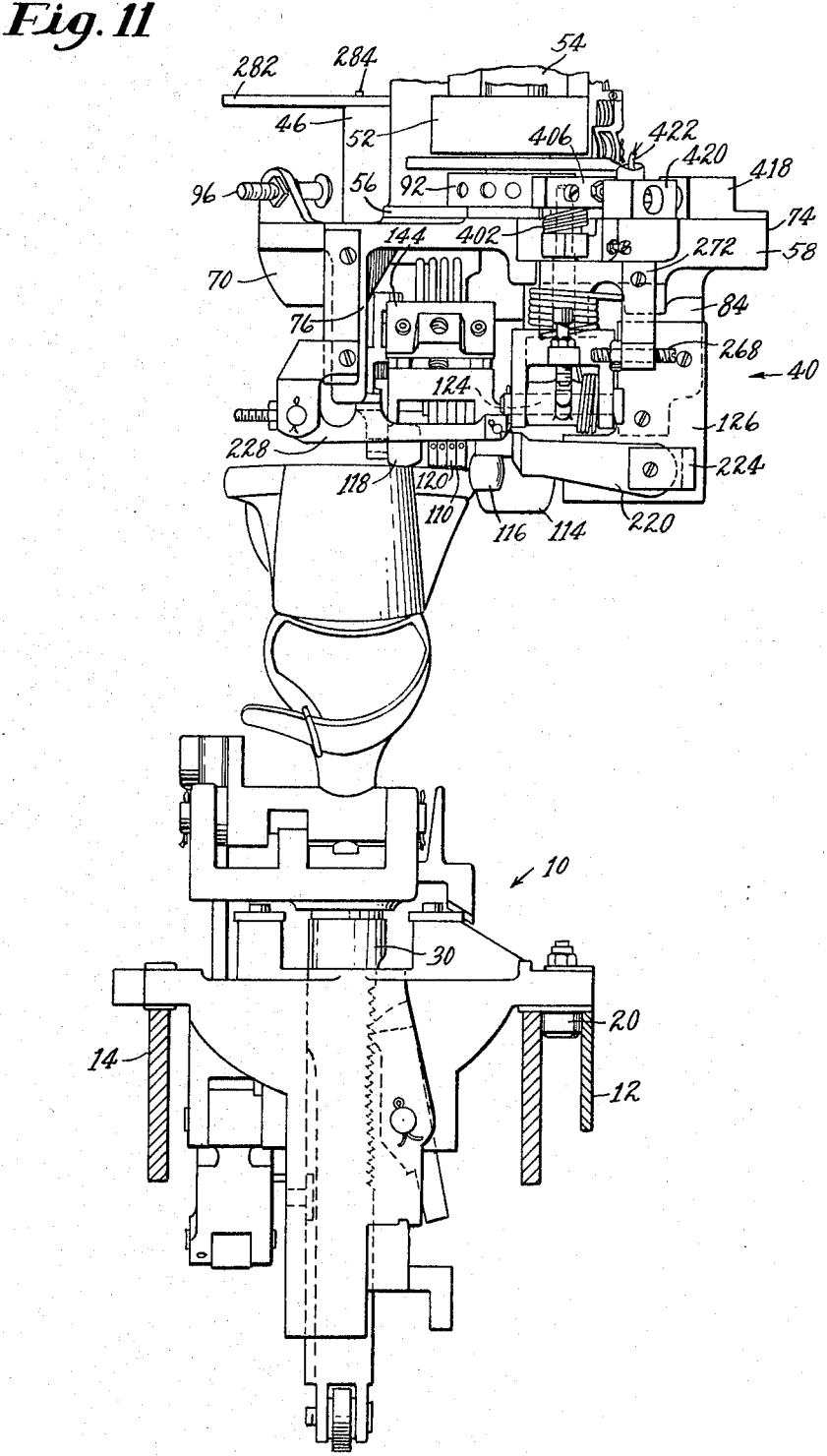
FIG. 11 is a partial front elevation of a portion of the apparatus shown in FIG. 2 illustrating the cementing head in engagement with a shoe bottom.

Each delivery member 120 is formed with a channel 169 intersecting the feeding passage of the member. Each channel slidingly receives a rod 170 pivoted at one end on a pin 172 which extends between the ears 136 and 138 of the subframe. Each rod has a transverse aperture 174 which may be alined with a passage by sliding of the rod in a channel and hence constitutes slide valve means. FIGS. 9 and 10 contrast to illustrate how, in accordance with a feature of the invention, the nozzle assembly operates to prevent adhesive from passing through the delivery members when the latter are not under pressure from a shoe bottom. In these figures the level of the working surface is indicated by a dash and dot line. In FIG. 9 the yoke 142 has been urged downwardly against the subframe by the spring 162. Because of the spacial relation of the pivot points and the point of intersection of the rods and members in the abutting relationship between the subframe 122 and the yoke 142, the rod members 170 enter the channels far enough so that the transverse apertures 174 of the rod members 170 are not alined with the longitudinal cement delivery passages of the delivery members 120 and the cement flow to the delivery areas is shut off. In FIG. 10 the pressure of a work surface upon the delivery areas 150 has tilted the members 120 as a group and the yoke therewith relative to the subframe by relative tilting about the pin 140. As a result, the rods 170 are partially withdrawn from the channels so that the transverse apertures 174 are alined with the passages 148 and the liquid cement may pass to the delivery areas of the feet of the members.

Referring to FIG. 3, it will be observed that the shoe bottom is not flat but has a scoop intermediate the toe and heel portions of the bottom. In accordance with another feature of the invention, means are provided for maintaining the delivery areas 150 of the delivery members 120 parallel with the bottom of the shoe to insure that the adhesive is properly delivered to the shoe bottom and that the adhesive path is not improperly wiped by the engagement therewith of a foot portion of the delivery members which trails the grooved delivery area 150. For this purpose the axis of rotation of the subframe 122 on the pin 124 is arranged substantially to coincide with the operational axis of the delivery areas 150 of the delivery members 120 which axis may be considered as defined by median transverse portions of the areas 150 under the conditions where the delivery members are being pressed against the work surface as in FIG. 10. Accordingly, rotation of the subframe is effective to rock the delivery areas 150 without substantial horizontal displacement.

Figure 8:
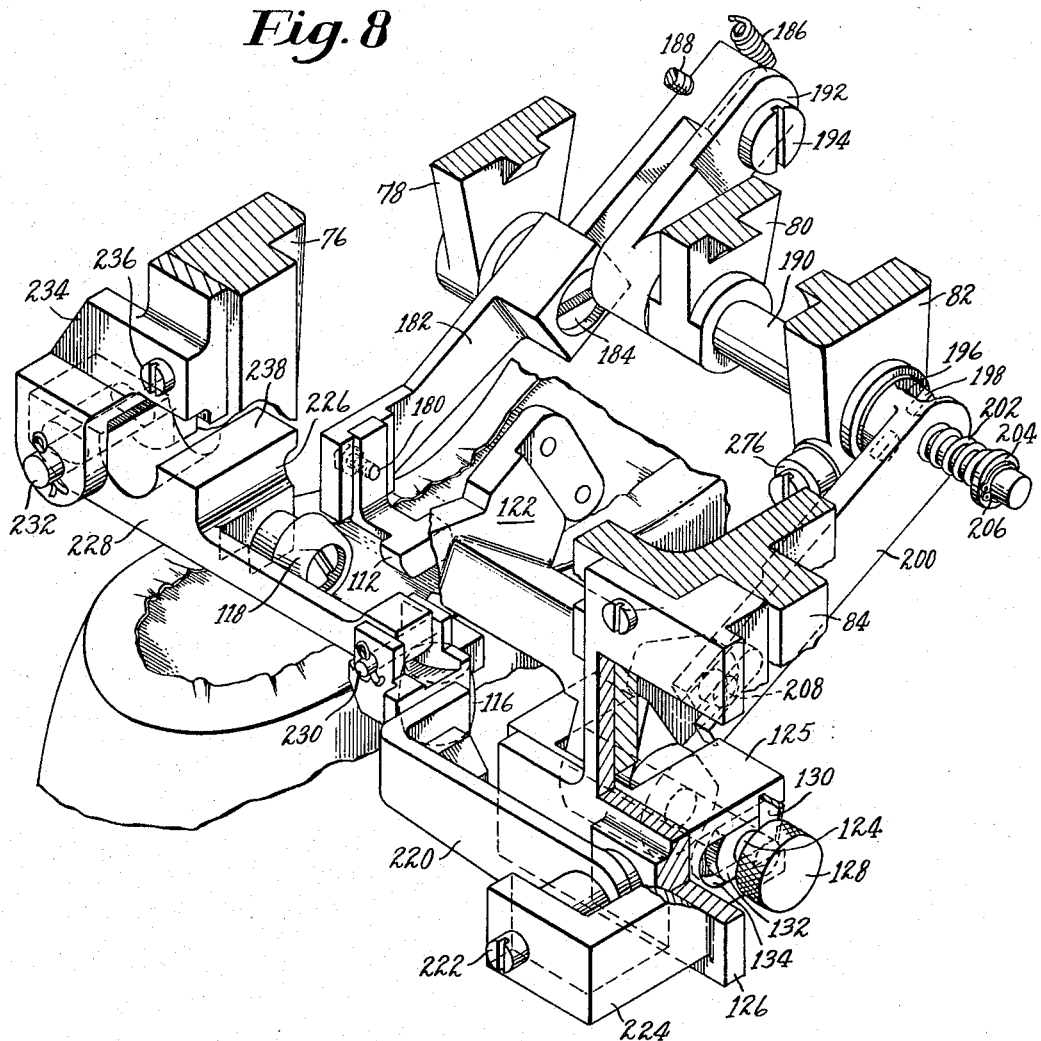
FIG. 8 is a view similar to FIG. 6 but with more parts broken away illustrating the operation of certain shoe engaging elements.

To provide for automatic rocking of the delivery areas to follow the contour of a shoe bottom in parallel relation thereto, there is provided means comprising the bottom feeler member 112 for sensing the height of the shoe bottom slightly in advance of the point of engagement of the delivery areas with the shoe bottom and means controlled by the feeler member 112 for rotationally positioning the subframe 122, and thereby the delivery areas 150, in accordance with the heightwise position of the feeler member. Referring to FIG. 8, the feeler member 112 is attached by a screw 180 to one end of a lever 182 which is pivotally mounted intermediate its ends on the leg 78 by a screw 184.

At the other end of the lever 182 there is connected one end of a spring 186, the other end of which is fastened to a pin 187 (FIG. 5) in the segment 72. The tensioning of the spring 186 biases the feeler member 112 downwardly to a predetermined position determined by the abutment of the lever 182 with a stop screw 188 threaded into the segment 72. A shaft 190 journaled through alined apertures in the legs 80 and 82 has affixed thereto at one end a crank arm 192, the outer end of which is pivoted to the end of the lever 182 opposite the member 112 by a screw 194. The other end of the shaft 190 extending through the leg 82 is reduced in diameter to form a shoulder 196 thereon carrying integrated key members 198 which pivot on the reduced diameter section of the shaft 190. A lever 200 is retained with its hub in locked relation with the key member 198 by a spring 202, one end of which bears against the lever while the other end bears against a washer 204 which is retained on the shaft 190 by a spring clip 206. The other end of the lever 200 is bifurcated for receiving between the furcations the head of a screw 208 threaded into the subframe 122 parallel to and in spaced relation to its axis of rotation on the pin 124. By this linkage it will be seen that heightwise movement of the feeler member 112 effects rotation of the subframe 122 and thereby rocking of the delivery areas. The lever 200 may be pulled outwardly against the spring 202 to disengage its forked end from the screw 208 to facilitate removal of the nozzle assembly when the pin 124 is removed.

The side roll 116 and the upper roll 118 are supported by linkage which spans the legs 76 and 84 (see FIG. 8). The side roll 116 is rotatably mounted on one end of a link 220, the other end of which is pivoted on a screw 222 extending through a bracket 224 and threaded into the plate 126, the bracket 224 being welded to the plate 126. The upper roll 118 is mounted for rotation on the boss 226 of a link 228. One end of the link 228 is pivoted to an end of the link 220 by a pin 230 while the other end is pivoted on a pin 232 carried in a mounting bracket 234 fastened to the leg 76 by screws 236. The boss 226 is formed with a flat upper surface 238 which abuts the lower surface of the leg 76 to limit upward tilting of the linkage so that the upper roll 118 has a predetermined upper position in which it may support the head on the bottom of a shoe.

The bell roll 114 is mounted in the support 58 by means which provide for yieldingly opposed vertical movement and limited yieldingly opposed horizontal movement from a predetermined position relative to the frame. To this end (see FIGS. 5 and 6), a shaft 240 is journaled through a vertical aperture in a cylindrical boss 242 of the segment 74. A yoke member 244 is welded to the lower end of the shaft 240 while an arm 246 is rockingly mounted on the yoke by a pin 248 journaled in the yoke. The outer end of the arm 246 is formed to provide a vertical T slot in which a slide 250, carrying the bell roll 114, may be secured at a selected heightwise position by a spring pin 252 passing through a hole in the slide 250.

The bell roll 114 is mounted for rotation on the bottom surface of the slide by a screw 254 which is threaded into the base of the slide. The arm 246 is biased for downward rocking by a spring 256 (FIG. 2), one end of which bears against the yoke while the other end bears against the arm. Rocking movement of the arm is limited in a downward direction by a limit screw 258 threaded through a boss 260 of the yoke and locked in position by a nut 262. As the arm 246 rocks downwardly, a projection 264 of the arm abuts the tip of the screw 258. The yoke member 244 is biased for rotation in a counterclockwise direction as seen from above by a spring 266 which encircles the boss 242 and has one end bearing against the leg 84 while the other end bears against the screw 258. Thereby the bell roll 114 is biased for horizontal movement to a predetermined position determined by the engagement of the boss 260 with a stop screw 268 having a lock nut 270 and being threaded through a bracket 272 attached to the segment 74 of the support 58 by a screw 274.

Figure 6:
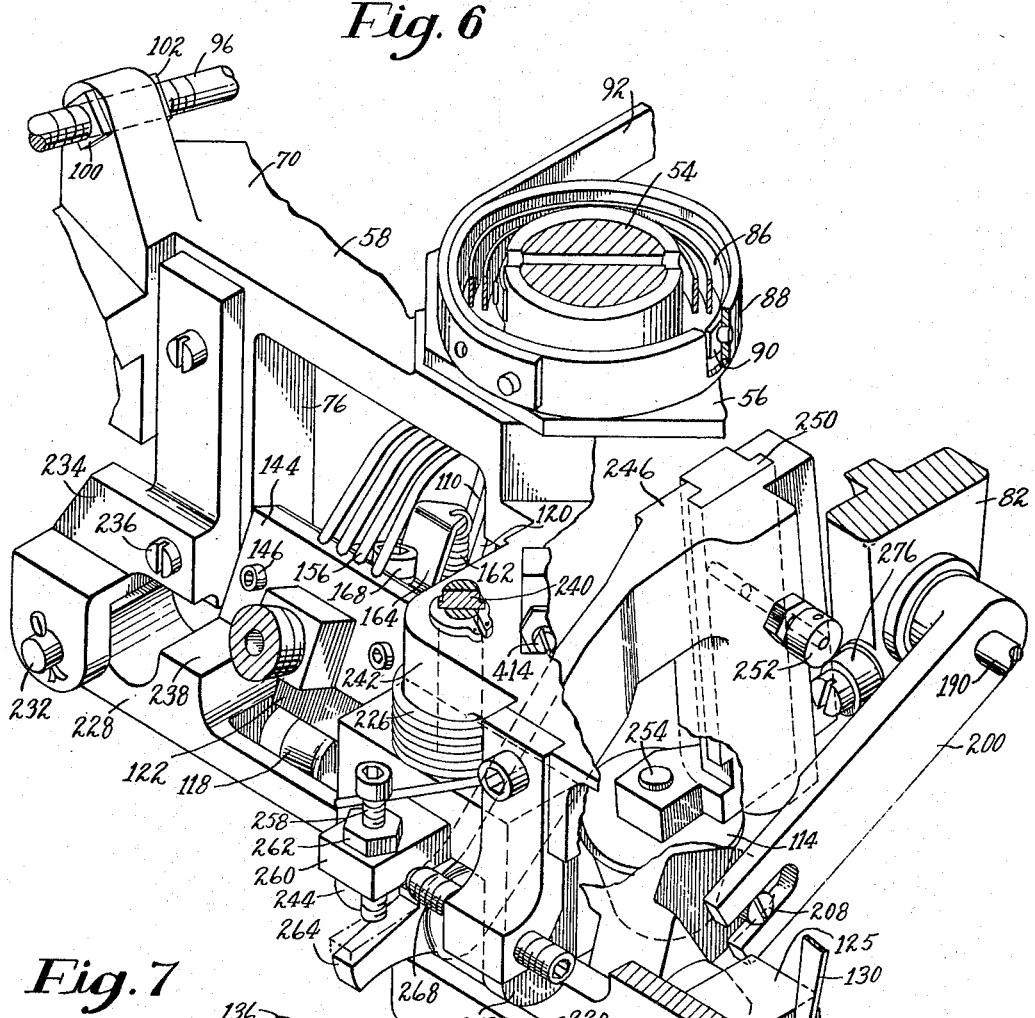
FIG. 6 is an enlarged angular view of a portion of the cementing head with many parts broken away showing, in particular, the mounting of the nozzle.

The arc of swing of the arm 246 and hence the scope of free lateral movement of the bell roll away from said predetermined position under pressure of a shoe is limited by a stop 276 screwed to the leg 82 as shown in FIG. 6. The position of the bell roll 114 when the arm is swung against the stop 276 is such that when the bell roll and the small side roll 116 are pressed against the side of a shoe, the support is rotated to aline the nozzle with and in proper spaced relation to the edge of the shoe to be cemented.

Figure 12:
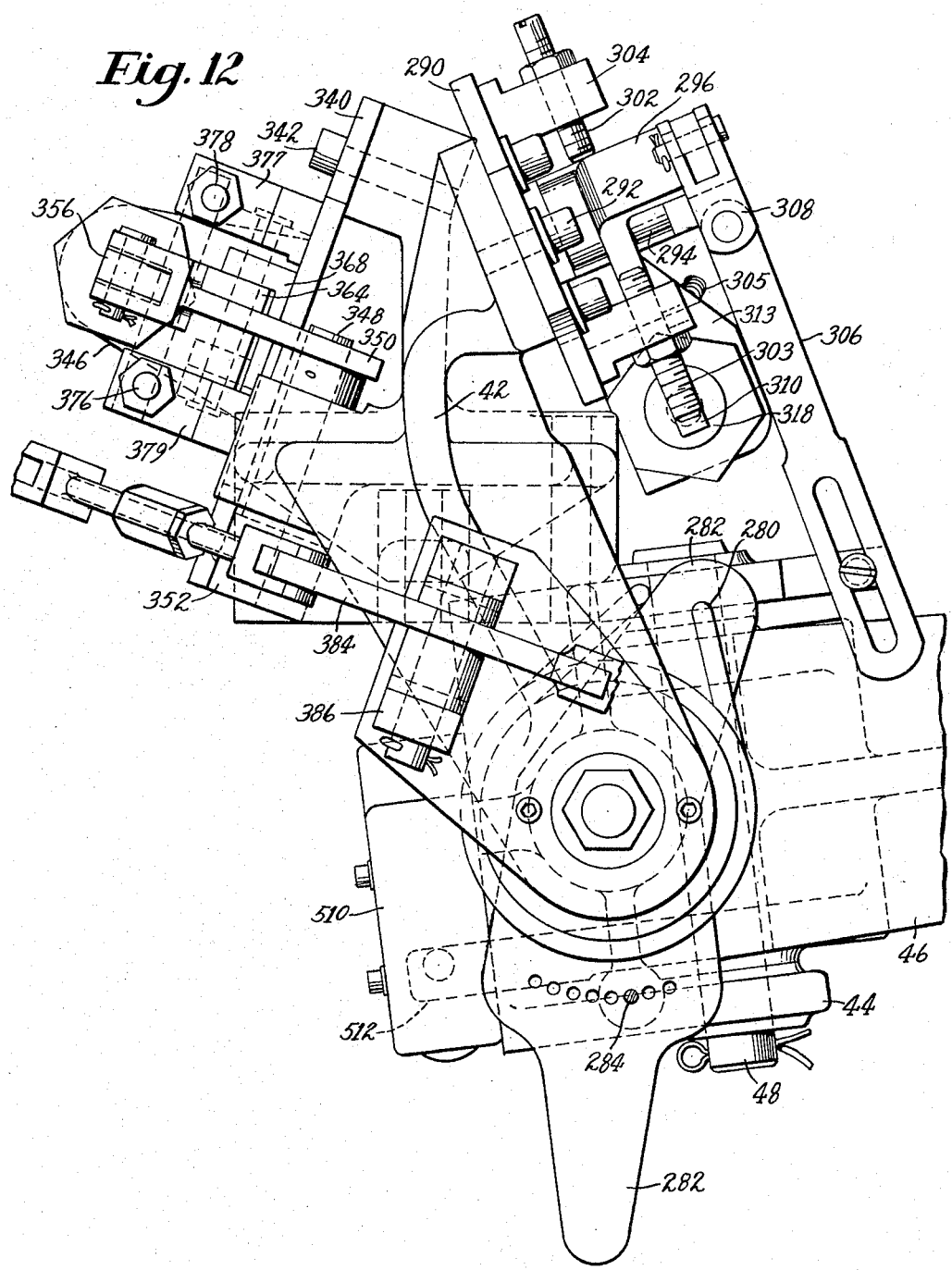
FIG. 12 is a plan view of a portion of the apparatus shown in FIG. 2.

During the cementing of the margin of a shoe bottom, the support is urged laterally so that the bell roll and the side roll engage the side of the shoe as aforesaid. The means for thus biasing the head laterally comprises a coil spring 280 on the bracket 42, which spring has one end bearing on the bracket (see FIG. 12) while the other end is anchored in a torque adjusting plate 282. This plate is held against relative rotation with respect to the yoke 44 by having an arcuately disposed series of holes, one of which is selected to receive a projection 284 formed on the yoke. At the same time the arm 46 is being urged to rock to move the head downwardly by a coil spring 286 (FIG. 3) encircling the pin 48 and bearing, respectively, on the yoke and arm. Accordingly, during the cementing of the bottom margin, the cementing head is pressed downwardly upon and sidewise against the shoe to orient the head as gaged by the upper and side rolls and suitably to rock the nozzle by pressure of the bottom feeler member against a shoe bottom. It will be understood that the spring 286 may be eliminated if desired by suitably weighting the head. The heightwise position of the head relative to the shoe bottom is determined by the upper roll 118 when positioned with its link 228 abutting the leg 76.

As previously recited, shoes are fed through the cementing station heel first with the shoe bottom at a predetermined height. Means are provided which are operative while the cementing head is out of engagement with a shoe for holding the cementing head in a predetermined position over the conveyor. In this position, shown in FIG. 2 where a shoe is about to arrive at the cementing station, the heel of the shoe will engage the bell roll 114 and the side roll 116, move the bell roll sidewise until the arm 246 abuts the stop 276 and thereafter cause the support 58 to rotate and aline the delivery members with the shoe margin to be cemented. The means for so holding the head against the horizontal force of the spring 280 and against the vertical forces of gravity and the spring 286 comprise a horizontal holding system and a vertical holding system.

Figure 13:
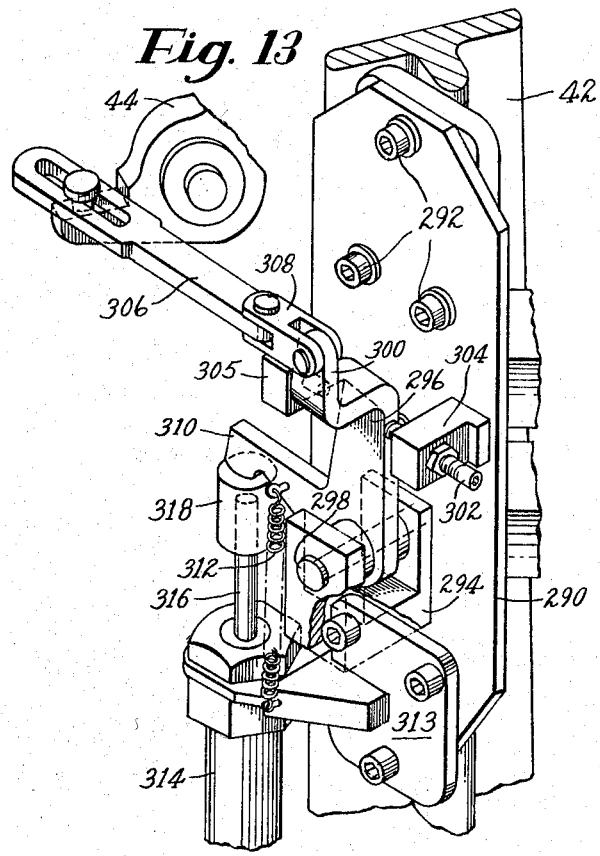
FIG. 13 is a partial angular view of a portion of the apparatus shown in FIG. 12.

The horizontal holding system comprises a mounting plate 290 (FIGS. 12 and 13) fastened to the bracket 42 by screws 292. To the mounting plate is welded a U-shaped bracket 294 in which a bell crank 296 is mounted on a pin 298 journaled in the bracket 294. One leg 300 of the bell crank is rockable between alined stop screws 302, 303 threaded through bosses 304, 305 welded to the mounting plate. The end of this leg is linked to the yoke by a lost motion linkage comprising a slotted link 306 and a connecting link 308. The leg 310 is connected to one end of a spring 312, the other end of which is fastened to a mounting bracket 313 for an air cylinder 314. The cylinder 314 has a piston rod 316 having a head 318 bearing on the end of the leg 310. It will be seen that when air is supplied to the cylinder 314, the bell crank 296 is rocked against the stop screw 302 so that the arm 46 is swung inwardly against the force of the spring 280 to a predetermined position.

Figure 14:
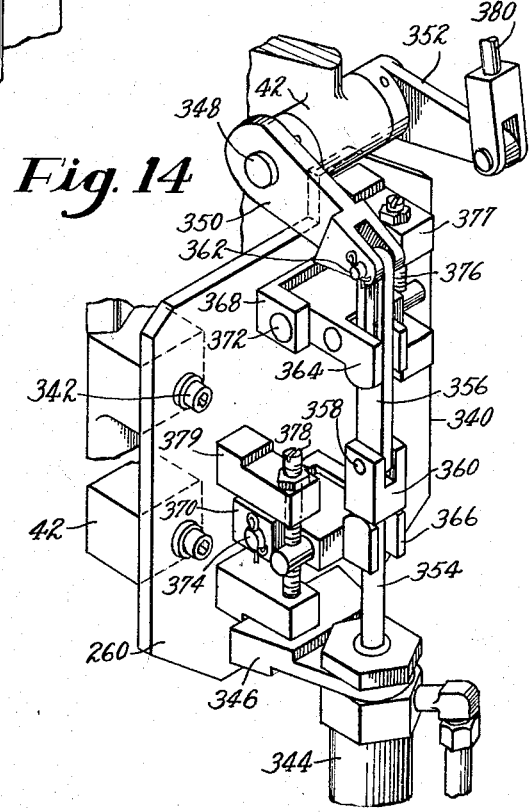
FIG. 14 is a partial angular view of the apparatus shown in FIG. 4.

The vertical holding system (FIGS. 12 and 14) comprises a mounting plate 340 attached to the bracket 42 by screws 342. An air cylinder 344 is mounted on a bracket 346 welded to the plate 340. A shaft 348 is journaled through the bracket 42 and has a crank arm 350, 352 affixed to each end on opposite sides of the bracket. A piston rod 354 of the cylinder 344 is connected to the crank arm 350 by a lost motion link 356. This link is fixed at one end by a pin 358 to a bifurcated head 360 on the piston rod while its other end is connected to the crank 350 by a pin 362 passing through alined apertures in the bifurcated end of the crank arm 350 and also passing through a slot in the link 356. Vertical movement of the link 356 is limited by upper and lower stops 364 and 366 which are pivotally secured to brackets 368, 370 by pins 372 and 374, respectively. Rocking of the stops 364 and 366 about their pins is restrained, respectively, by upper and lower sets 376 and 378 of alined stop screws which may be adjusted in upper 377 and lower 379 brackets to determine the upper and lower limits of movement of the link 356. Referring to FIGS. 3 and 4, the end of the crank arm 352 is connected to a lower bifurcated end of a rod 380 having intermediate thereof a turnbuckle 382 and having its upper bifurcated end connected to one end of a bell crank 384 pivoted on a bracket 386 at the top of the bracket 42 by a pin 388. The other end of the bell crank 384 is connected to a wire 390 which extends to a shackle 392 on the plate 65. Accordingly, it will be seen that when air is supplied to the cylinder 344 at its upper end to pull the rod 354 downwardly, the bell crank 384 will be rocked counterclockwise as seen in FIG. 4 to exert a lifting force on the head 40.

In order to release the head 40 from these holding means when a shoe comes along so that the head may be positioned by the engagement of the shoe with the previously described shoe engaging elements, control means are provided comprising a means for sensing when the heel end of a shoe engages the bell roll 114. To this end, a switch actuating armature 400 is freely pivoted on the upper end of the shaft 240 and is yieldingly urged to rotate clockwise (FIG. 16) by a spring 402 thus either bringing an upright projection 403 of the arm 400 against a stop screw 404 in a split arm 406 clamped on the shaft 240 by a screw 408 or, if the screw 404 is moved away upon movement of the bell roll by a shoe, carrying a screw 410 into actuating relation with a switch 412 until stopped by a stop screw 414. The screws 404 and 410 carry lock nuts 416 by which they may be secured in predetermined position. A housing 418 (FIG. 2) and fitting 420 protects the electrical leads 422.

At the toe portions of shoes where the bottom margin is oblique to the feed path, the cementing head will have a lateral component of movement which combines with the movement of the shoe along the feed path to increase the speed at which the dispensing area of the nozzle moves over the shoe bottom. Accordingly, unless the rate of flow of liquid adhesive is increased during the cementing of this portion of the shoe bottom, the band of adhesive will be starved. In accordance with a feature of the invention, means is provided for sensing rotation of the support beyond a predetermined angular position with respect to the feed path, which angular rotation implies the existence of a lateral component of movement requiring a greater flow of cement, and means controlled by the sensing means for increasing the pressure at which the liquid adhesive is supplied to the nozzle.

The rotational sensing means, best shown in FIG. 5, comprises a circular face cam 430 mounted on the shaft 54 just beneath the lower furcation 52. The upper face of the cam 430 has a peripheral cam rise sector 432 which is engaged by a cam follower 434 on one arm of a bell crank 436 when the support is rotated by the side rolls in following the toe portion of a shoe. The crank 436 is pivoted on the arm 46 by a screw 438. The follower 434 is maintained in engagement with the cam 430 by a spring extended plunger 440 which engages the other short arm of the bell crank. Also pivoted on the screw 438 is a switch actuating arm 442 having mounted through its outer end a switch engaging member 444 adapted to actuate a switch 446 in a housing 448 upon swinging of the arm 442 clockwise as shown in FIG. 5. The arm 442 is biased to swing clockwise by a spring 450, one end of which bears on the follower arm of the crank 436 while the other end of the spring bears against the arm 442, but its clockwise movement is restrained by a screw 452 bearing against the short arm of the crank 436 so that the arm 442 cannot move into switch actuating position unless the bell crank 436 is rocked clockwise by raising of the follower by the cam upon rotation of the support 58 to its toe-following position (see FIG. 15).

Figure 17:
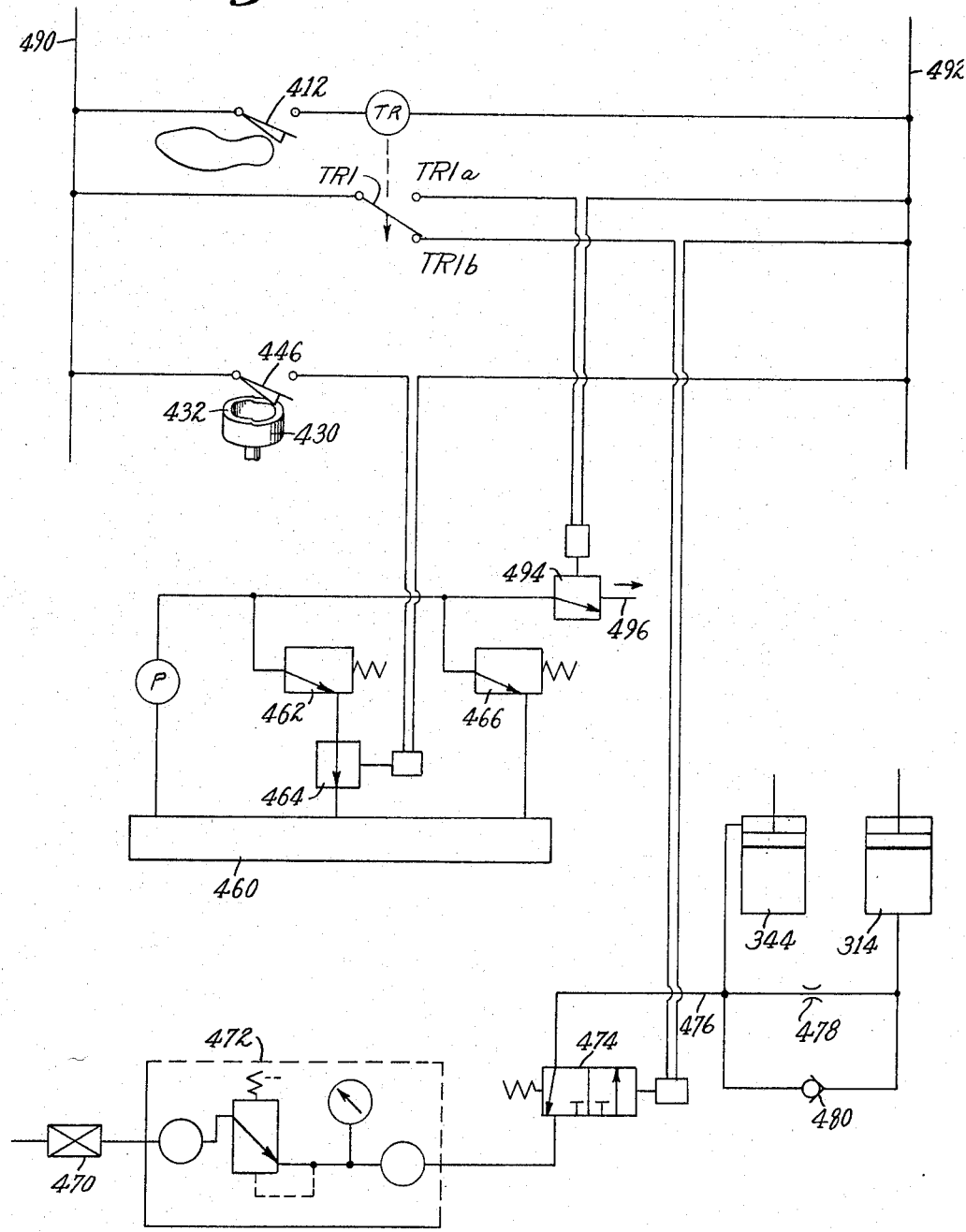
FIG. 17 is a diagram of the electrical circuit and adhesive and air supply systems of the apparatus.

Referring to FIG. 17, the liquid adhesive supply means for the cementing station comprises a pump P which normally circulates the liquid adhesive from an adhesive sump 460, through a relief valve 462 and a normally open single flow solenoid valve 464 back to the sump whereby the pressure of the liquid adhesive on the output side of the pump is predetermined by the setting of the relief valve 462. This pressure is adjusted to satisfy the flow requirements for cementing a shoe bottom where no lateral component of movement is present. A second relief valve 466 connects the pump output line with the sump, this relief valve being set for a higher pressure suitable for providing the flow required for cementing the toe portion of a shoe bottom.

Air is supplied from a source 470 through a filter-regulator 472 to a two-position, three-connection directional solenoid valve 474. From the valve 474 an air supply conduit 476 extends to the vertical cylinder 344 and thence through a fixed restriction 478 and check valve 480 connected in parallel relation to the horizontal cylinder 314.

In operation, when the main rink circuit is energized, leads 490 and 492, constituting opposite sides of the branch supply line, will be energized and the solenoid of the valve 474 will be energized, supplying air under pressure to the vertical and horizontal cylinders. Also the pump of the adhesive supply system will be operating to provide a source of liquid adhesive at the lower one of its two pressures, the liquid adhesive returning through the relief valve 462. The solenoid valve 474 is energized through TR1b so that the cementing head is held in a "ready" position predetermined with respect to the feed path such that the heel of a shoe moving on a pallet through the cement station will engage the bell roll 114 actuating the switch 412 to effect closure thereof. Closing the switch 412 energizes the coil TR of a time delayed-release relay of the single-pole double-throw type causing the armature TR1 to be transferred from contact TR1b to contact TR1a. Opening the TR1b contact deenergizes the solenoid of the valve 474 connecting the supply line 476 to exhaust, the vertical cylinder exhausting directly through the line 476 while the horizontal cylinder exhausts freely through the check valve 480 so that the cement head is dropped on the shoe and presses laterally and vertically thereupon. Practically simultaneously therewith the contact TR1a is closed energizing the solenoid of a normally closed single flow solenoid valve 494 which then opens to supply liquid adhesive through a conduit 496 which provides a passage extending to and through pipe fittings which extend through a T-fitting 498 and nipple 500 (FIG. 2) to the fitting 61. A pressure gage 502 is connected to the other branch of the T-fitting 498. The liquid adhesive thus flows from the supply through the conduit 496, down through the shaft 54 and out again through a relatively short section of thin-walled flexible tubing 504 to the nozzle 110. Assuming that the supply lines have been previously filled, the pressure of the adhesive is built up immediately so that when the nozzle bears down on the shoe bottom, opening the nozzle valves, adhesive then starts to flow as the shoe is moved past the nozzle. As the movement of the shoe brings the toe portion thereof to the nozzle, the lateral pressure on the gaging side rolls causes the head to rotate until the switch 446 is actuated. Thereupon the solenoid of the valve 464 is actuated closing off the passage for liquid adhesive through the relief valve 462 so that the pressure of the adhesive supplied by the pump is now controlled by the relief valve 466. Shortly before the nozzle reaches the tip of the toe, the bell roll 114 clears the toe, opening the switch 412. After a short period of time the relay TR transfers its contact from TR1a to TR1b, closing the valve 496 and opening the air line 476 to the air supply. The vertical cylinder 344 then receives the pressure of the air supply directly while because of the check valve 480 the horizontal cylinder 314 is supplied through the restriction 478. Accordingly, the cement head is first lifted and then swung into its predetermined ready position. As the nozzle comes off the shoe bottom, the nozzle valves close terminating the flow of adhesive from the nozzle.

A switch 510 (FIGS. 3 and 4) is mounted on the yoke 44 and is arranged for actuation by a rearward extension 512 of the arm 46 when the cementing head is in its lowered position. The switch 510 is connected into the control circuit of the rink for stopping the drive belt should the head not be raised before a shoe arrives at the cementing station.

Having thus described our invention, what we claim as new and desire to secure by Letters Patent of the United States is:

1. In a coating apparatus for applying liquid coating material to marginal areas of the bottoms of shoes, means for moving lasted shoes, to which soles are to be cemented, in a fixed bottoms up attitude in a predetermined rectilinear horizontal feed path, a support mounted for vertical and horizontal bodily movements during operation of the machine in paths transverse of said feed path, a nozzle carried by said support and adapted when supplied with liquid coating material under pressure and transferred along a surface in engagement therewith for applying a band of coating material to said surface, and gaging means carried by said support and adapted to engage the upper and side surfaces of a shoe, means for yieldingly holding the support in disposition relative to said feed path operative to cause the feeding movement of a shoe along the path to effect engagement thereof with the gaging members to cause the support through said gage members to bear downwardly upon the bottom and horizontally against the side of the shoe, said gaging means being operative, when the support bears downwardly upon the bottom and horizontally against the side of a shoe moving as aforesaid, to orient the support to effect transfer of the nozzle in coating engagement with the margin of the shoe bottom along one side thereof.

2. Apparatus as in claim 1 additionally comprising means for supplying liquid coating material under pressure to the nozzle.

3. Apparatus as in claim 2 additionally comprising means for yieldingly urging the support to move horizontally transverse of said feed path.

4. Apparatus as in claim 3 additionally comprising means for holding said support in a predetermined position relative to the feed path, means for sensing the positioning of a shoe in predetermined relation to the support, and means controlled by the sensing means in response to the sensing of the positioning of a shoe in said predetermined relation for effecting release of the holding means.

5. In a coating apparatus, means for moving a lasted shoe endwise and bottom up in a rectilinear feed path through a coating station, a nozzle having a dispensing area and mounted for yielding heightwise and lateral movement transverse of said feed path during a coating operation, means including gaging means adapted to engage a shoe moving in said feed path through said station for causing the dispensing area of said nozzle to be transferred along and in engagement with the marginal area along one side of the bottom of said shoe, and means for supplying coating material under pressure to the nozzle during transfer of said dispensing area along said marginal area.

6. In a coating apparatus, means for moving a lasted shoe endwise and in bottom up attitude in a rectilinear feed path through a coating station, a nozzle having a dispensing area and mounted for yielding heightwise and lateral movement transverse of said feed path, means including gaging means adapted to engage a shoe moving in said feed path through said station for causing the dispensing area of said nozzle to be transferred along and in engagement with the marginal area of the bottom of said shoe, means for supplying coating material under pressure to the nozzle during transfer of said dispensing area along said marginal area, and means controlled by work pressure between the shoe and said nozzle for interrupting the supply of coating material to the dispensing area of said nozzle when said dispensing area is not engaging the shoe under pressure.

7. In a coating apparatus, a device for applying a stripe of coating material to a piece of work comprising a support, a plurality of delivery members pivoted on said support on a first axis, the members having longitudinal passages terminating in outlet openings in the work engaging ends thereof and having channels intersecting the passages, a corresponding plurality of rods slidably received in said channels and pivoted on said support on a second axis parallel to and spaced from the first axis, said rods having transverse apertures alinable with the passages by sliding of the rods in the channels, means interconnecting the delivery members for limited relative movement, and means yieldingly urging the delivery members as a group toward a position in which the passages are closed by the rods.

8. Apparatus as in claim 7 in which the interconnecting means comprise means for supplying coating material to the delivery members.

9. In a coating apparatus for applying liquid coating material to the bottom marginal areas of the bottoms of shoes moving endwise bottoms up in a predetermined rectilinear horizontal feed path, a support mounted for vertical and horizontal bodily movements during operation in paths transverse of said feed path and for rotation during operation about a vertical axis, a nozzle carried by said support and comprising a plurality of spring pressed delivery members having forwardly grooved feet adapted when supplied with liquid coating material under pressure and transferred along a coating path on a surface in predetermined angular relation of the grooves therewith to apply a uniformly wide band of coating material along said path, gaging means carried by said support and adapted to engage the upper and side surfaces of a shoe, means for yieldingly holding the support in disposition relative to said feed path operative to cause the feeding movement of a shoe along the path to effect engagement thereof with the gaging members to cause the support through said gage members to bear downwardly upon the bottom and horizontally against the side of the shoe, said gaging means comprising a roll for engaging the upper and spaced side rolls for engaging the side surfaces of a shoe, one of said side rolls being mounted for limited yielding movement, said gaging means being operative when the support bears downwardly upon the bottom and horizontally against the side of a shoe moving in the feed path to orient the support to maintain the nozzle in said predetermined angular relation with the desired coating path along the marginal areas of one side of the shoe bottom, means including a normally closed valve connecting said nozzle with a source of liquid coating material under pressure, means for holding the support in a predetermined position relative to the work path wherein a shoe moving in the feed path will engage the movable side roll and cause it to yield to its predetermined limit, means controlled by movement of the movable side roll to said limit position for effecting release of the holding means and for opening the valve of the coating supply means, means operative for yieldingly urging the support horizontally transverse of the feed path whereby said side rolls become operative to rotate said support to cause said nozzle to follow the coating path along the side of a shoe bottom, and means responsive to rotation of the support beyond a predetermined angular position with respect to the feed path for increasing the pressure at which said coating material is supplied to the nozzle to compensate for the increased rate of movement of the nozzle over the toe portion of the shoe bottom margin by reason of the transverse component of movement.

References Cited by the Examiner

UNITED STATES PATENTS

| | | | |
|---|---|---|---|
| 2,042,479 | 6/1936 | Newhall | 118—410 |
| 2,255,854 | 9/1941 | MacKenzie | 118—410 |
| 2,268,876 | 1/1942 | Kagley | 118—3 |
| 2,486,847 | 11/1949 | Hokett | 15—580 |
| 2,544,172 | 3/1951 | Naugler | 118—410 |
| 2,615,668 | 10/1952 | Ernst | 137—156 X |
| 2,730,735 | 1/1956 | Hannable et al. | 118—410 X |
| 2,765,768 | 10/1956 | Paulsen | 118—410 |
| 2,793,382 | 5/1957 | Fletcher | 15—579 |
| 3,035,287 | 5/1962 | Vlcek et al. | 118—3 |

MORRIS KAPLAN, *Primary Examiner.*

RICHARD D. NEVIUS, *Examiner.*